United States Patent
Mars et al.

(10) Patent No.: US 11,539,706 B2
(45) Date of Patent: Dec. 27, 2022

(54) AUTHORIZED OFF-LINE ACCESS METHODS AND APPARATUS

(71) Applicant: Proxy, Inc., San Francisco, CA (US)

(72) Inventors: Denis Mars, San Francisco, CA (US); Simon Ratner, San Francisco, CA (US)

(73) Assignee: Proxy, Inc., San Francisco, CA (US)

(*) Notice: Subject to any disclaimer, the term of this patent is extended or adjusted under 35 U.S.C. 154(b) by 101 days.

(21) Appl. No.: 17/195,407

(22) Filed: Mar. 8, 2021

(65) Prior Publication Data
US 2021/0281573 A1  Sep. 9, 2021

Related U.S. Application Data

(60) Provisional application No. 62/986,408, filed on Mar. 6, 2020.

(51) Int. Cl.
*H04L 9/40* (2022.01)

(52) U.S. Cl.
CPC ........ *H04L 63/102* (2013.01); *H04L 63/0853* (2013.01); *H04L 63/0861* (2013.01); *H04L 63/0884* (2013.01); *H04L 2463/121* (2013.01)

(58) Field of Classification Search
CPC ............... H04L 63/102; H04L 63/0853; H04L 63/0861; H04L 63/0884; H04L 2463/121
See application file for complete search history.

(56) References Cited

U.S. PATENT DOCUMENTS

| | | | |
|---|---|---|---|
| 2006/0289647 A1 | 12/2006 | Shafer | |
| 2012/0084210 A1 | 4/2012 | Farahmand | |
| 2015/0072618 A1 | 3/2015 | Granbery | |
| 2015/0379506 A1 | 12/2015 | Griffin | |
| 2020/0084486 A1* | 3/2020 | Cho | G06F 21/10 |
| 2021/0044976 A1* | 2/2021 | Avetisov | H04L 9/321 |

FOREIGN PATENT DOCUMENTS

EP    1752908 B1    11/2014

OTHER PUBLICATIONS

International Search Report and Written Opinion for PCT/US2021/021376, dated Jun. 30, 2021.

* cited by examiner

*Primary Examiner* — Huan V Doan

(57) ABSTRACT

A smart device includes a transceiver for outputting a user identifier to an authentication server, for receiving a data packet and a pre-authorization token from the authentication server, wherein the data packet comprises reader identifiers associated with a plurality of reader devices, and wherein the pre-authorization token indicates that smart device is approved to interact with the plurality of reader devices, a storage device for storing the reader identifiers and the pre-authorization token, wherein the transceiver is for receiving a reader identifier from a reader device, a processor for determining an authorized reader condition when the reader identifiers includes the reader identifier, wherein the processor is for determining a reader token in response to the pre-authorization token and the authorized reader condition, wherein the transceiver for transmitting the reader token to the reader device.

20 Claims, 7 Drawing Sheets

AUTHORIZED OFF-LINE ACCESS METHODS AND APPARATUS

CROSS-REFERENCE TO RELATED APPLICATIONS

The present invention claims priority to and is a non-provisional of U.S. Application No. 62/986,408 filed Mar. 6, 2020. The provisional application is incorporated by reference herein, for all purposes.

BACKGROUND

The present invention relates to user authentication. More specifically, the present invention relates to off-line authentication of users in order to access to goods, services, locations, and the like. Still further, the invention relates to maintaining privacy of users when receiving such access.

User access to goods, services, locations, or the like are often based upon "identification" of the user. The identification may be direct, i.e. through the capture of biometric data of the user, passwords, or the like, or indirect, i.e. based upon presentation of a smart card, credit card, or the like. Additionally, the identifications are typically performed on demand, in real-time.

As an example of direct authentication, a user may provide a thumb print to a terminal, in response the terminal may send the thumb print to a fingerprint database, the database may authenticate the finger print and send an authentication signal back to the terminal, finally, the terminal may open a gate for the user to pass in response to the authentication signal. A problem with such approaches includes that privacy is often forfeited by the user. More specifically, when biometric data of the user is captured, it is transmitted over computer networks and is compared to biometric data stored in databases. Because such personal data is highly sensitive, the computer networks and biometric databases are often targets for attack by hackers, governments, or the like. Another problem is that the user's access to goods, services, or the like may recorded in such databases. Because of this, behavioral profiles be built up and used to target the user, without the user's consent.

As an example of indirect authentication, a user may present an employee badge to a terminal, in response the terminal may read the badge and send the card number to an employee database. The database may authenticate the card number and send an authentication signal back to the terminal. Finally, the terminal may retract a door latch to allow the user to pass into a building response to the authentication signal. A problem with such approaches includes that they do not guarantee that the user is the one using the employee badge. A person finding the employee badge on the ground may also present the employee badge to the terminal and be granted access. Yet another problem is that dedicated hardware such as badges are relatively expensive and are often misplaced or lost.

An additional overriding problem with the above methods is that the terminals often require real-time access to a back-end database to determine whether the user is authorized or not. Further, in some cases the user may also be required have real-time access to a network to provide specific data to the terminals. Because of this, the locations of the terminals (and users) may be limited, as terminals must have wireless access or hard-wired access to a computer network, and as users will require wireless access to network resources. Such solutions are disfavored for applications where network wires are not readily accessible; for places where there are limited wireless coverage, e.g. basements, secure facilities, retrofit applications, or the like; for other places where computer network coverage is not dependable, and the like. Without dependable coverage, the service to the user will also be undependable (e.g. a user will not be allowed into a building, a user will not be provided with appropriate software, a user will not be logged into the appropriate accounts, and the like).

In light of the above, what are desired are more dependable solutions with reduced drawbacks described above.

SUMMARY

The present invention relates to user authentication. More specifically, the present invention relates to off-line authentication of users in order to access to goods, services, locations, and the like, while maintaining privacy of users.

Some embodiments of the present invention include a process that may occur prior to when authentication is desired, and a process that occurs when nm-time authentication is desired. A first process includes authenticating a user with an authentication server and receiving pre-authentication data therefrom. The pre-authentication data may include a list of reader devices the user is pre-authenticated to communicate or transact with, a pre-authentication token that authenticates the user, and the like. To determine such data, the authentication server may determine an authorized account associated with the user (via email address, telephone number, biometric data, a key, etc.) and based upon policies or other conditions stored within the authentication server, the authentication server may determine a list of reader devices, or the like that the user is authorized to interact with. In some cases, the pre-authentication data may then be cached in secure form or secure location within a user device. User devices may include smart phones, smart watches, smart rings, or the like.

A second process typically comprises a run-time process (after being pre-authenticated), when the user approaches a reader device to obtain goods, services, or the like. In some processes, the reader device provides reader data, including an identifier and a nonce (or other random or pseudo random data) to the user device. In response, the user may enter a password, biometric data, or the like, within an application to enable the user device to respond. Without requiring computer network access, the user device then determines in real-time whether portions of the reader data have been stored and referenced in the pre-authentication data stored in the user device. For example, the user device may determine whether the reader identifier is in the stored list of authorized readers previously obtained from the authentication device. If so, the user device generates a responsive data for the reader device. In some cases, the responsive data may include a pre-authentication token, a portion of the reader data (e.g. nonce), and the like. In some cases, the responsive data may be encrypted and then provided to the reader device. In turn, without requiring access to a computer network, database, or the like, reader device validates the responsive token. If valid (e.g. cryptographic signature authenticated, within a validity period for the token, nonce validated, or the like), the reader device authorizes or facilitates access of the user to the good, service, locations, or the like. As can be seen, at run-time, access to computer networks, or the like is not required for the user or the reader device, accordingly embodiments may be implemented in highly secure areas, as well as areas with limited computer network coverage.

According to one aspect, a method for an authorization system is described. One method includes performing a pre-authorization process. A pre-authorization process may include transmitting with a transceiver of a smart device, an identifier associated with a user of the smart device to a remote authentication server, determining in the remote authentication server a pre-authorization condition and identifiers associated with a plurality of reader devices the user is pre-authorized to interact with in response to the identifier associated with the user, and a plurality of policies, and forming in the remote authentication server, a data packet comprising the identifiers associated with the plurality of reader devices in response to the pre-authorization condition. A pre-authorization technique may include forming in the remote authentication server, a pre-authorization token in response to the identifier and to the pre-authorization condition, receiving with the transceiver of the smart device the data packet and the pre-authorization token from the remote authentication server, and storing in a secure storage of the smart device the data packet and the pre-authorization token. A method may include performing a run-time process. A run-time process may include receiving with the transceiver of the smart device, an identifier associated with a reader device, determining with a processor of the smart device an authorized reader condition when the identifiers associated with the plurality of reader devices includes the identifier associated with the reader device, and forming with the processor of the smart device a reader token in response to the pre-authorization token stored in the secure storage, and the authorized reader condition. A run-time technique may include transmitting with the transceiver of the smart device the reader token to the reader device, determining with a processor of the reader device an authorized user condition in response to the reader token, and directing with the processor of the reader device a peripheral device to perform a user-perceptible action for the user in response to the authorized user condition.

According to another aspect, a smart device is disclosed. An apparatus may include a transceiver configured to output a user identifier associated with a user of the smart device to a remote authentication server, wherein the transceiver is configured to receive a data packet and a pre-authorization token from the remote authentication server, in response to the user identifier, wherein the data packet comprise reader identifiers associated with a plurality of reader devices, and wherein the pre-authorization token indicates that smart device is approved to interact with the plurality of reader devices, and a storage device coupled to the transceiver, wherein the storage device is configured to store the reader identifiers and the pre-authorization token. In various aspects, a transceiver is configured to receive a reader identifier associated with a reader device. A device may also include a processor coupled to the transceiver and the storage device, wherein the processor is configured to determine an authorized reader condition when the reader identifiers includes the reader identifier associated with the reader device, wherein the processor is configured to determine a reader token in response to the pre-authorization token and the authorized reader condition. In various aspects the transceiver is configured to transmit the reader token to the reader device, and the reader device is configured to direct a peripheral device to perform a user-perceptible action for the user in response to the reader token.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
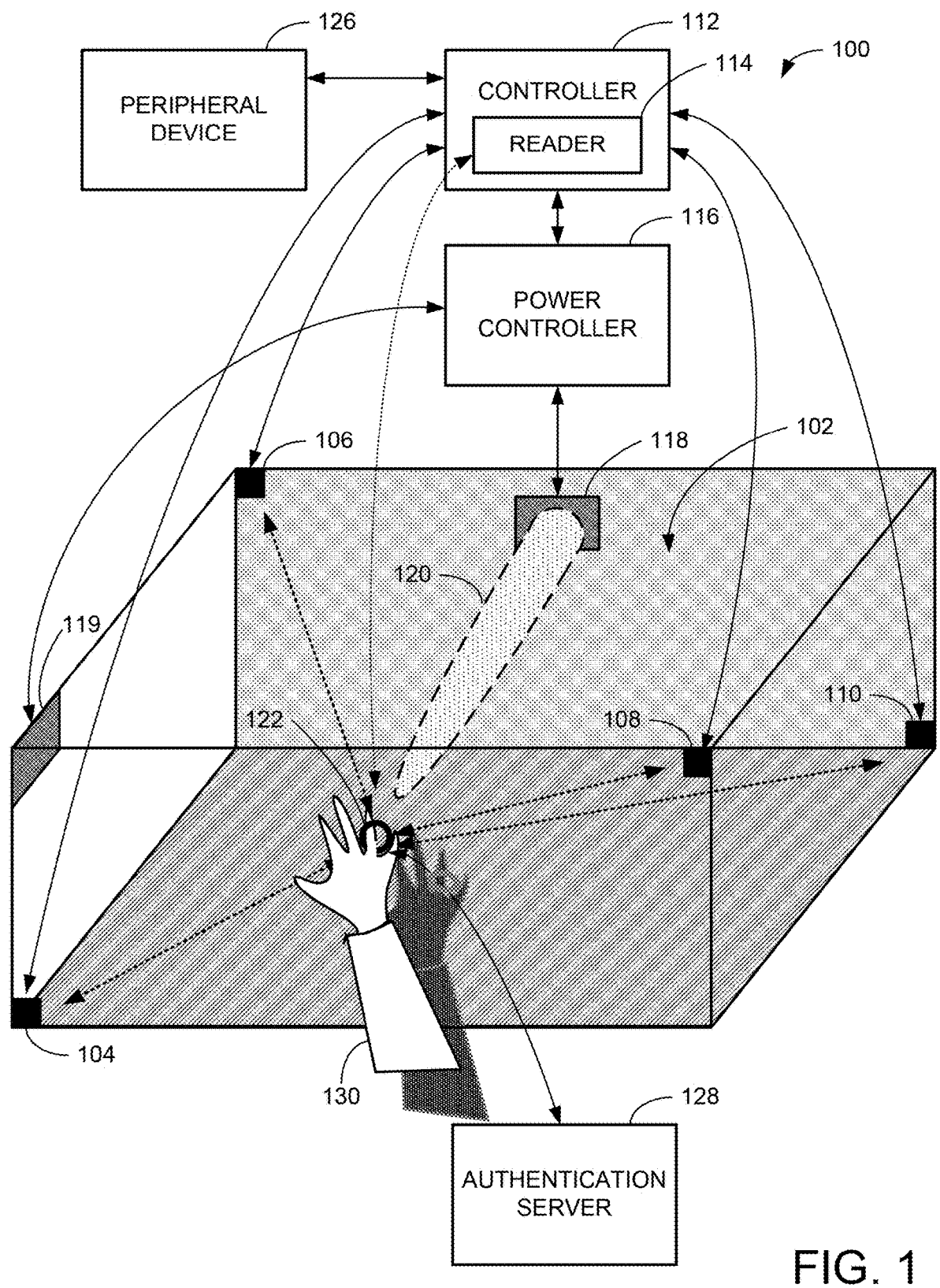
FIG. 1 illustrates a system diagram according to various embodiments.
Figure 2A:
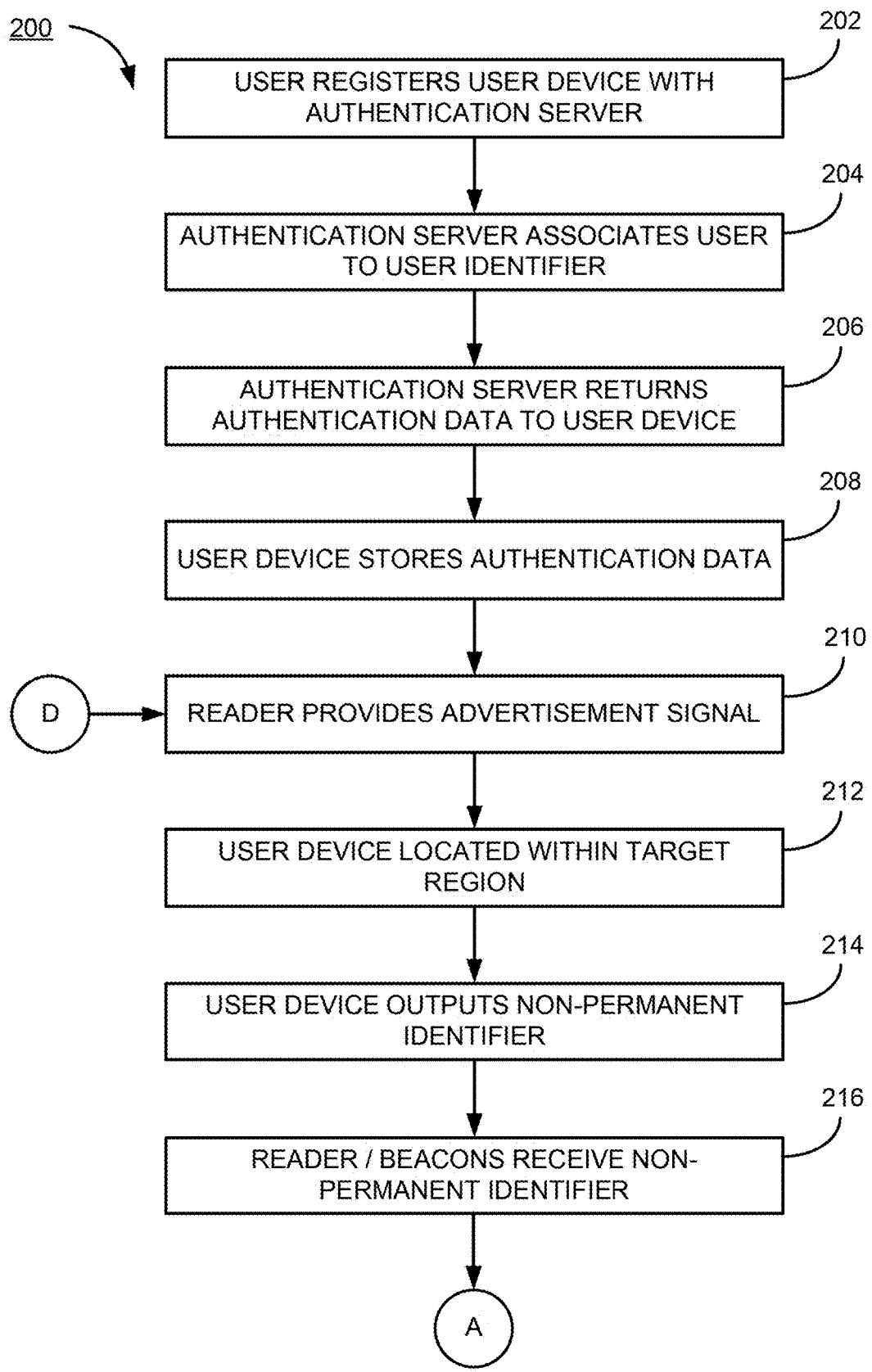
FIGS. 2A-D illustrates a block diagram of a process according to various embodiments.
Figure 2B:
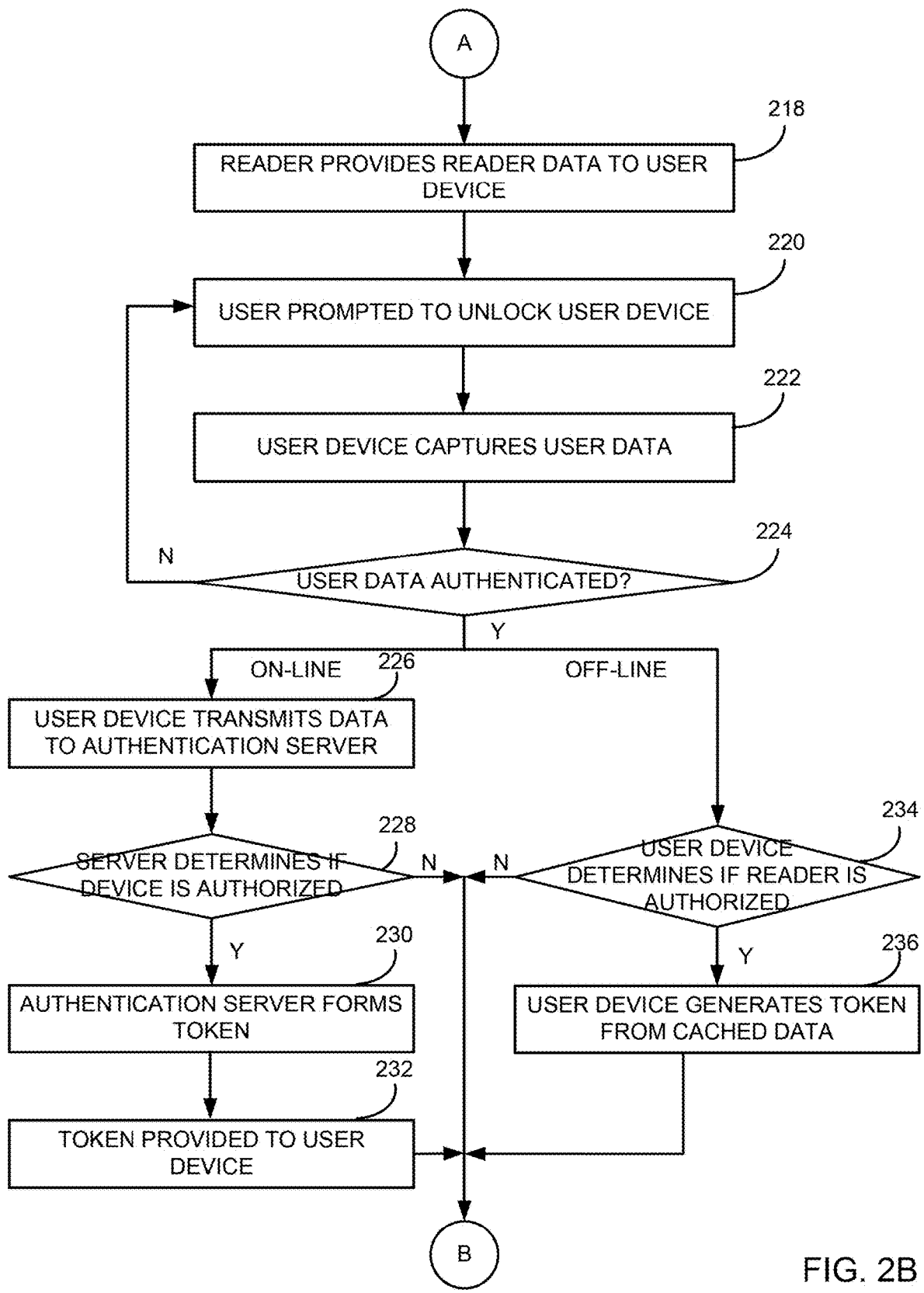
Figure 2C:
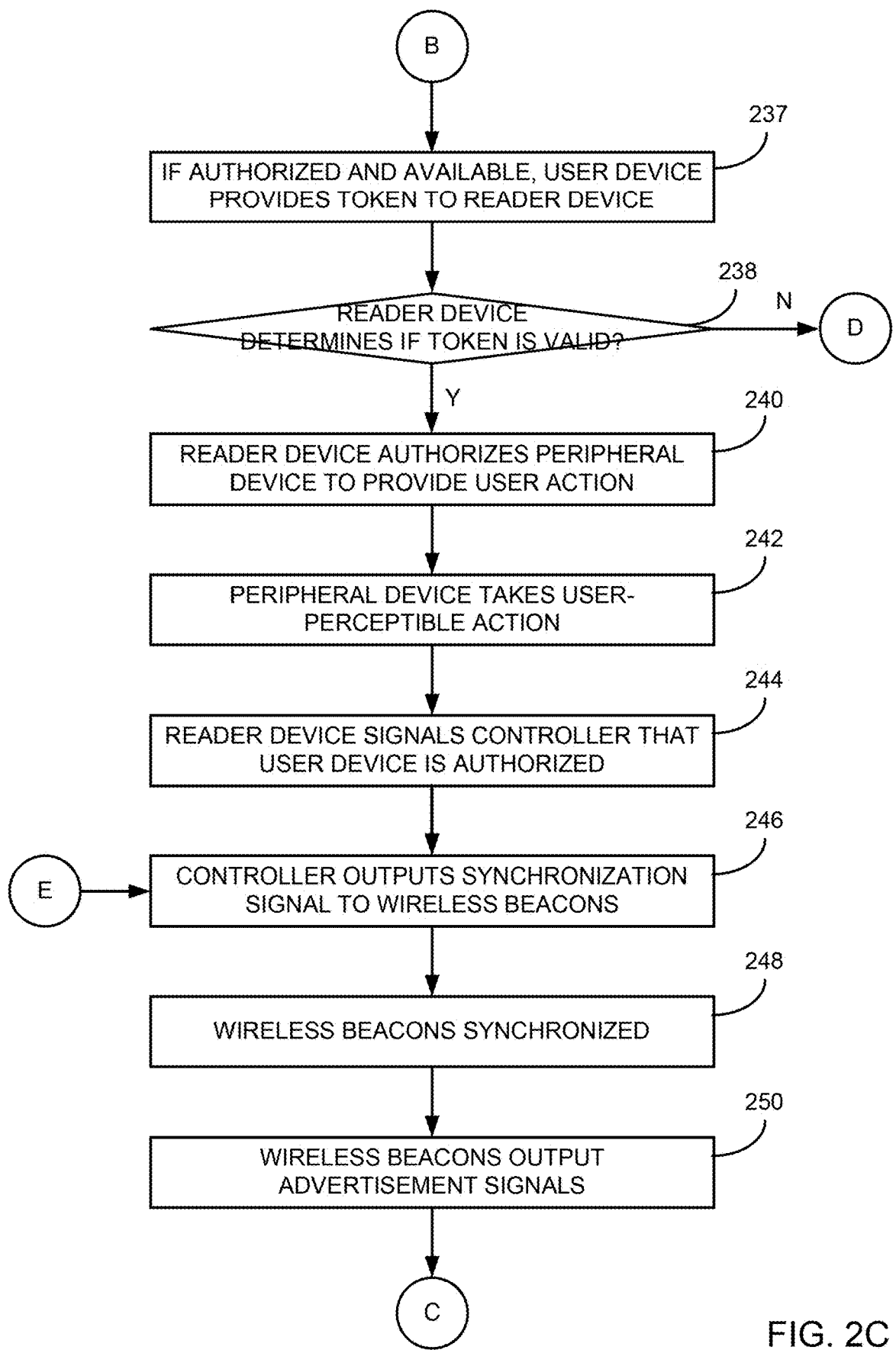
Figure 2D:
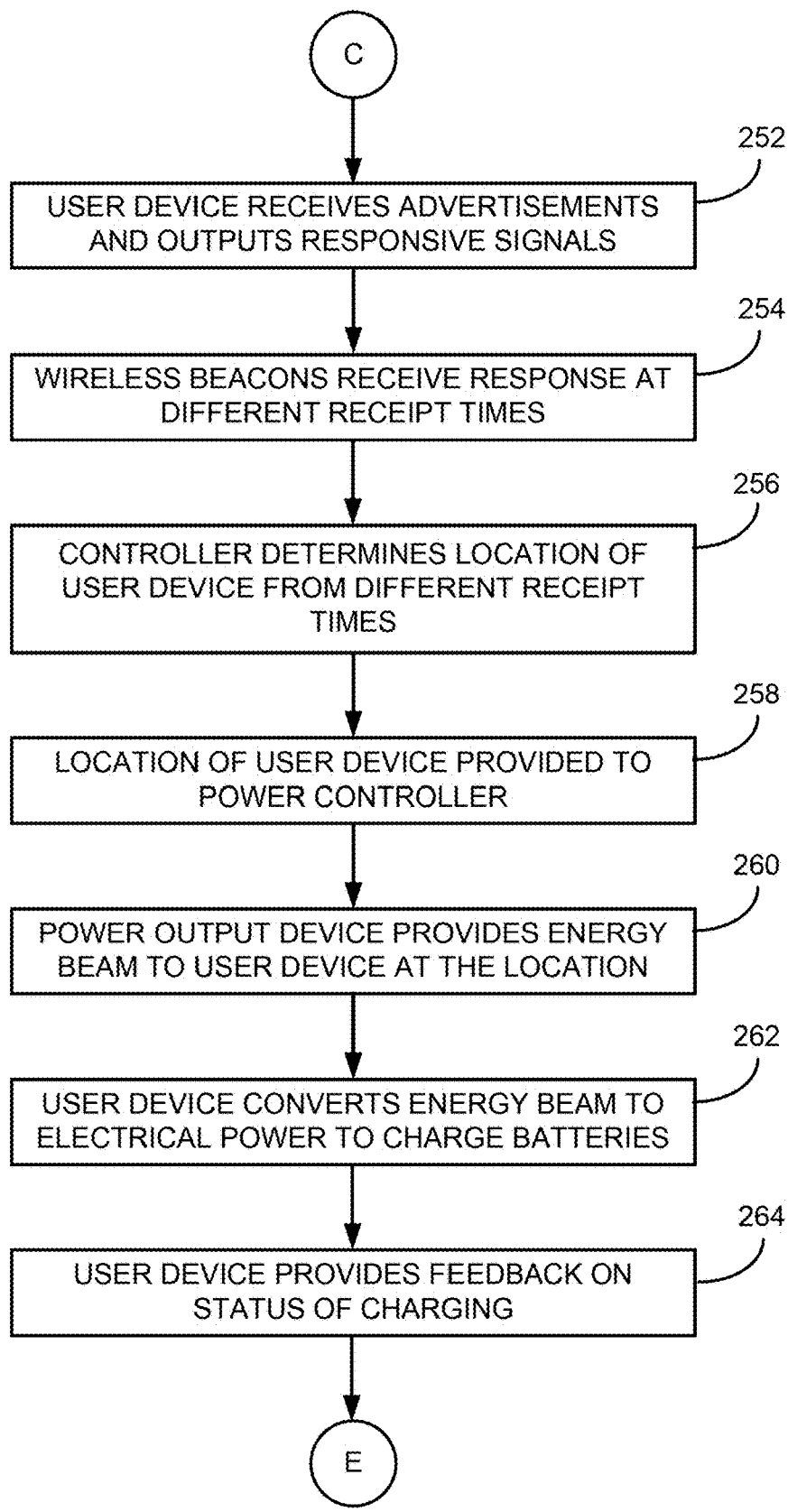

FIG. 1 illustrates a system diagram according to various embodiments. More specifically, FIG. 1 illustrates a system 100 associated with a geographic region 102. Within region 102, a number of ultrawide band (UWB) beacons 104, 106, 108 and 110 are disposed within known geographic locations. In FIG. 1, beacons 104-110 are illustrated in corners of a room 102, however in other embodiments, beacons 102-110 may be placed in many other locations within region 102, such as along the baseboard, on the ceiling, or the like. The specific geographic locations for beacons 102-110 are typically known by a system administrator, or the like of system 100. In FIG. 1, four UWB beacons are illustrated, however in other embodiments, a greater or a lesser number of UWB beacons may be used. In still other embodiments, other types of beacon technology may be used, such as Bluetooth, Zigbee, UWB, Wi-Fi, or the like.

In some embodiments, UWB beacons 104-110 are coupled to a controller 112. The interconnection may be via a wired or wireless connection. For example, the interconnection may be via UWB, Bluetooth, Wi-Fi, Mesh or other wireless communication technologies; in other embodiments, the interconnection may be via network cable, CAT 5, 6, or the like, optical cable, or the like. In some embodiments, controller 112 may include a reader 114, and in other embodiments, reader 114 may be separate from controller 112. Functionality of reader 114 which will be described below.

In the example in FIG. 1, controller 112 is coupled to a wireless power controller 116, that is configured to control one or more wireless power output devices, e.g. 118, 119. It is contemplated that distance charging solutions from companies such as WiTricity, Ossia, or others may be used to enable wireless power charging. In various embodiments, based upon data from controller 112, power output device 118 can output a beam of energy 120, to a mobile device 122. In other embodiments, controller 112 may be used to directly or indirectly control other devices, such as a peripheral device 126.

In various embodiments, device 122 may be a computing device, such as a laptop computer or desktop computer, a tablet device, a smart phone, a fitness tracker, a smart ring, a smart watch, an embedded medical device, or the like. In various embodiments, device 122 is configured to output short-range data signals for beacons 104-110. The short-range data signals may include advertising data (e.g. UWB, Bluetooth, etc.), tokens or other secure data, as will be described below.

As illustrated, device 122 may be coupled to an authentication server 126 (e.g. a cloud-based service). In various embodiments, device 122 may directly communicate with authentication server 126 (e.g. via 4G, 5G, Wi-Fi, mesh-network) on demand, or not in real-time In other embodiments, device 122 may send and receive data with authentication server 126 via the help of an intermediary device, e.g. a network coupled laptop, tablet, smart phone, smart watch, or the like. As will be described below, authentication server 128 typically provides a token or other secure data to device 122 for its interaction with controller 112. As mentioned above, controller 112 may control power controller 116 or other peripheral device 126, based upon authentication of device 122 (e.g. user 130).

FIGS. 2A-D illustrates a block diagram of a process according to various embodiments. More specifically, FIGS. 2A-D illustrates a process 200 that may be performed in some embodiments of the present invention. Without limiting embodiments, for sake of convenience, reference to elements of FIG. 1 will be used below.

Initially, a user 130 of device 122 may register with authentication server 128, step 202. In some embodiments, this may take the form of user 130 registering one or more of their e-mail address, smart phone telephone number, financial information or their like with authentication server 128. As discussed above, device 122 may be any number of devices such as a laptop, smart phone, tablet, wearable technology, embedded medical device, and the like. In some embodiments, a hardware identifier associated with device 122 may also be registered with authentication server 128.

In some embodiments, authentication server 128 may associate a user identifier and additional data with device 122, step 204, and in some cases may provide the user identifier and additional data to back to device 122 for storage, step 206. In some embodiments, providing the additional data may be part of a pre-authorization process where the additional data includes off-line authorization data (e.g. a pre-authorization token), as will be described below. In some embodiments, the additional data may also include a list of devices (e.g. reader devices, electronic data, services, etc.) the user is authorized to interact with, based upon one or more policies. For example, if the user is a new accounting employee, a corporate policy may specify that the user will be granted access to electronic financial records but not research and development records; the user will be granted access to physical financial data rooms, but not to assembly line regions; the user will be provided with a business computer, and not a workstation; and the like. In various embodiments, the policies may be specified by a system administrator through an administration web site, portal, app, or the like in conjunction with authentication server 128.

In various embodiments, access to physical locations, to electronic documents, to services (e.g. wireless power), to physical objects, and the like may be controlled via readers devices such as reader 114. In some embodiments, reader devices may be associated with identifiers, and authentication server 128 may determine which reader identifiers or reader devices a user/user identifier is authorized to access. In one example, a user identifier may be associated a list of reader devices that includes reader devices within a first building, but not a second building, with a first set of computers, but not a second set of computers, a first computer network, but not a second network, and the like. Accordingly, in such an example, the off-line authorization data may specify identifiers for reader devices associated with the authorized goods or services, e.g. with the first building, the first set of computers, the first computer network.

In various embodiments, the user identifier and the additional data may be stored in device 122, step 208. In some cases, the data from authentication server 128 may be stored in a (software) encrypted or protected form in a conventional memory in device 122. In other cases, device 122 may include a separate secure hardware memory device, where the data is stored in an (hardware) encrypted or protected form, or the like.

In operation, periodically, reader 114 outputs an advertisement signal (e.g. UWB, BLE, or the like), step 210. In some processes, device 122 includes a short-range transmission device, such as ultrawide band (UWB), Bluetooth (including BLE), ZigBee, Wi-Fi, or the like that provides the herein described wireless transmissions. Next, user 130 carries or moves device 122 within region 102, step 212. Region 102 may be an interior location, e.g. an office, a library, a convention center or the like, or an outdoor location, e.g. a fairground, amusement park, or the like. In some cases when device 122 receives the advertisement signal, device 122 may respond with an identification signal, step 214. In some embodiments, device 122 may use the same wireless transmission technology.

As discussed above, the identification signal output by device 122 may not be permanently associated with device 122 or the user, accordingly, reader 114 does not necessarily know the actual identity of the user. This lack of user identifiable information is believed to be highly advantageous for reader 114, controller 112, power controller 116, or the like, as user identification and usage of such services is not stored within those devices or such data are stale after a period of time. For example, reader 114 may temporary store a first non-permanent identifier of the user device, however periodically user device 122 will change or rotate the non-permanent identifier it outputs. Accordingly, the next time user device 122 approaches the target region 102, user device 122 may output a second non-permanent identifier to reader 114. In various embodiments, there is no (or very little) correlation between the first non-permanent identifier and the second non-permanent identifier, accordingly reader 114, controller 112, power controller 116, or the like may not be able to track the usage by the user. In some cases, usage data of the user may only be maintained by authentication server 128, so that payment for usage may be reconciled, and in other cases authentication server 128 may only be used for authorization, and usage data is not maintained. Additionally, because user identifiable information is not maintained in such devices, hackers, government-directed actors, or the like will be less inclined to hack into such systems to obtain user data. The operation of these systems will be thus be improved as they will store less sensitive data, will have lower memory requirements, and will be less targeted for hacking, or the like.

In some embodiments, reader 114 may directly receive the advertisement transmissions from device 122 directly, step 216. In other embodiments, the signals may be captured by one or more of wireless beacons 104-110, step 216, and provided to reader 114 via controller 112.

In response, reader 114 may directly or indirectly respond to device 122 by outputting reader data, step 218. As mentioned above, reader 114 may respond to device 112 via controller 112 and wireless beacons 104-110, or may respond directly to device 112. In various embodiments, the reader data may include a unique identifier and additional data, such as a nonce, a random or pseudo-random number, or the like.

In some embodiments, in response to the reader data, user 130 may optionally be prompted to unlock device 122, step

220. In some examples, user 130 may provide a password, a PIN, biometric data (e.g. fingerprint, their face, iris scan, blood vessel data, audio outputs, etc.), performance data (e.g. performing particular gestures or actions), or the like, which is sensed or captured by device 122, step 222. In other embodiments, a second-factor authentication may also be used (e.g. confirmation telephone call, text, e-mail message).

In various embodiments, two processes for device 122 providing a responsive token to reader device 114 are contemplated and will be described below. In one set of embodiments, in response to successful user identity unlock, step 224, device 122 may transmit some or all of the reader data and the user identifier to authentication server 128, step 226.

In some cases, device 122 may use any conventional transmission technology, e.g. 4G, 5G, Wi-Fi, mesh-network (Bluetooth, UWB), or the like to communicate with authentication server 128. In response to this data, authentication server 128 may verify that the user identifier is authorized to communicate/operate with reader 114, step 228. In particular, authentication server 128 may determine whether the user identifier is stored in a database or the like, and if so, whether it has permission to communicate with reader 114. For example, a company may have access policies that permit the user to access multiple reader devices including reader 114, and then authentication server 128 compares the user identifier to the company policies.

In various embodiments, if the user is authorized, authentication server 128 may form a token by encrypting a data payload that includes portions of the reader data, such as the nonce, the reader data, or the like, step 230. In various embodiments, encryption may be performed by digitally signing the payload data (e.g. nonce, valid time period, expiration time, etc.) with a private key associated with authentication server 128, or the like. In other embodiments, other types of encryption (e.g. symmetric key) may also be used, and additionally, hashing or the like may also be performed. In various embodiments, the token may then be returned to user device 122, typically using the same transmission technology, step 232

A second set of embodiments may include a run-time process that does not utilize real-time communications with authentication server 128. In some embodiments, in response to successful unlock, step 224, device 122 may determine whether it is authorized to communicate with reader 114 (controller 112). In some embodiments, as discussed in step 206 above, authentication server 128 may also provide off-line authorization data (e.g. a pre-authorization token) including a list of reader identifiers the user device is authorized to communicate or interact with. In some embodiments, the list of readers may be periodically updated upon request of device 122 or pushed by authentication server 128, e.g. once a day, once a week, when device 122 is within communication range capability of authentication server 128, or the like. As examples, device 122 may request updated data at midnight, when device 122 is docked; authentication server 128 may push updated data to device 122 once a week, immediately when an update to policies occurs, when device 122 is docked or charging, and the like.

In some embodiments, the communication between device 122 and authentication server 128 (step 206) may be facilitated by another local device, e.g. a user's smart device, a desktop or laptop computer, and the like. These embodiments reduce the need for device 122 to communicate directly with authentication server 128. Instead, the local device communicates with authentication server 128 to receive the off-line authorization data, and device 122 may communicate via short-range means with the local device to receive the updated data. In some embodiments, the short-range means may include direct connection, (e.g. a cable, or a dock), a wireless connection (e.g. Bluetooth, Zigbee, UWB, IR, Wi-F or the like).

In step 234, the reader identifier associated with reader 114 may be compared to a list of readers it is authorized to communicate with (in the off-line authorization data). In some embodiments, the reader identifier, user identifier, and other secure data the like may be input to a secure storage device/processor, and a yes or a no response may be output from the device, and in other embodiments, no visible feedback is provided to the user. If communication is authorized, device 122 may use additional off-line authorization data stored in secure hardware memory device, such as the pre-authorization token, and the reader identifier, the nonce, or the like to generate a token, step 236. In some embodiments, the nonce, reader identifier, and the like may be stored in a payload section of the token, or the like. In some embodiments, steps 234 and 236 may be performed within the secure memory device itself, by a processor of the device, and combinations thereof. In some embodiments, the off-line authorization data may itself include a digitally signed data payload, or the like.

In various embodiments, if a token described above is received or formed within user device 122, it may then be transmitted to reader 114, typically using the same transmission technology (e.g. UWB, Bluetooth, BLE, ZigBee, Wi-Fi, etc.), step 237. In some embodiments, additional data may be combined with the token, or passed along with the token (within a payload data portion) to reader 114. The additional data may include data gathered by user device 112, e.g. GPS data, user movement indicia, history data (e.g. a list or readers seen by device 112), and the like. In some cases, this additional data may be encrypted using a symmetric key, or the like to protect the data during transmission.

In various embodiments, in response to the token, reader device 114 determines whether the token is valid, step 238. In some cases, reader device 114 uses a public key associated with authentication server 128 to determine if the data payload was digitally signed by authentication server 128. Additionally, reader device 114 may determine whether a time period associated with the token is valid, e.g. has the token expired?, is the current time within a temporal validity period of the token?, etc.

By keeping track of the nonce, or the like, when transmitting the reader data, reader device 114 may reduce the chance that the token can be reused.

In some embodiments, reader device 114 may output a signal to peripheral device 126 authorizing a user-perceptible action, step 240. In some embodiments, the user-perceptible action may include: unlocking a latch on a door, activating an electronic device (e.g. turning on a light, turning on a television, providing authorization tokens for applications (e.g. Netflix login credentials, social media login credentials, etc.), outputting a sound, displaying an image (e.g. welcome employee/visitor screen, displaying a schedule, transaction approval, etc.), activating a computer, authorizing access to computer resources (e.g. logging in, access to particular directories, enabling particular applications), paying for a good or service, and the like, activating an electro/mechanical device (e.g. unlocking a car door, starting a car engine, unlocking a turnstile, vending a good, or the like), step 242. In light of the present disclosure, one of ordinary skill in the art will recognize additional actions that may be provided to users, after being authenticated by the reader device.

In some embodiments, reader device 114 may also output a signal to controller 112 authorizing delivery of power by power controller 116, or the like, step 244.

In various embodiments, controller 112 periodically sends a synchronization signal, e.g. a time stamp, to wireless beacons 104-110, step 246. This synchronization signal may be use by wireless beacons 104-110 to maintain synchronization therebetween, step 248. In some examples, this signal may be sent periodically, e.g. every hour, every day, or on-demand, e.g. when initial presence of device 112 is determined by any one of wireless beacons 104-110, when reader 114 senses presence of device 112, or the like.

In some embodiments, one or more of wireless beacons 104-110 may provide an advertisement signal within region 102, step 250. As discussed above, wireless beacons 104-110 may be based upon UWB, Bluetooth, Zigbee, Wi-Fi, or the like. In response, device 122 may receive advertisement signal and provide a responsive output signal, step 252. In various embodiments, each of wireless beacons 104-110 receive the output signal, but at slightly different times, step 254. The respective receipt times are then used by controller 112 to determine the location of device 122, step 256. More specifically, the differences in receiving time are typically due to the differences in distance between device 122 and the respective wireless beacons. A discussed above in step 246, because wireless beacons 104-110 are synchronized to a common clock, the receive time differences between beacons 104-110 can be used to more accurately locate device 122 in the x, y and z dimensions within location 102. In other embodiments, other types of user device location technologies may also be used.

In various embodiments, the location of device 122 is then provided to wireless power controller 116, step 258. The communication may utilize any conventional communication scheme, such as a i2C, or the like. In turn, wireless power controller 116 controls wireless power output device 118 to wirelessly provide an energy beam 120 to device 122, step 260. As mentioned above, some distance charging solutions are currently under development and may be used for various embodiments.

Based upon the location coordinates of device 112 within location 102, as well as calibration information, in some embodiments, power controller 116 may specify a series of phases for power output device 118 to direct energy beam 120 to device 122. In some embodiments, to reduce potential interference with other objects within location 102, wireless power output device 118 may be located on a ceiling in the middle of a room, or high-up in the middle of a region, or the like. In other embodiments, to increase reliability, multiple power wireless output devices (e.g. output devices 118 and 119) may be provided within different positions within location 102. In such embodiments, if device 122 is occluded with respect to a first power output device (i.e. not within a line of sight), power may be provided from a second or third power output devices. The specific power output device that provides power may be vary over time, for example, device 122 may first receive power from a first power output device, then as device 122 moves within location 102, device 122 may receive power from a second power output device, then the first power output device, then the third power output device, etc. As mentioned above, the specific power output device may depend upon which power output device, for example, has the most direct (or least impeded) line of sight, or the like to device 122.

In some embodiments, a receiver of device 122 receives energy beam 120, and converts it to electrical energy, step 262. The electrical energy may be used to power device 122 and also recharge an internal power source (e.g. battery, capacitor) of device 122. In some embodiments, device 122 may provide feedback on the charging process to controller 112 through communications via any of wireless beacons 104-110, step 264. Typically, the process repeats periodically, e.g. $\frac{1}{10}^{th}$ second, $\frac{1}{50}^{th}$ second, 1 second, or the like, so that as device 122 moves within region 102, the location may be tracked, and the beam of energy 120 may be more precisely directed towards device 122.

In some embodiments, output device 122 may be provided with an energy input region (see 326 in FIG. 3) which receives energy beam 120. In some embodiments, such energy input region may include a spherical lens, an aspherical lens, or other type of lens structure to facilitate redirection of an incoming energy beam that is not close to normal (e.g. greater than +/−10 degrees, 30 degrees, 45 degrees or the like) to a surface of the energy input region towards the energy input region. In some cases, the energy beam is redirected to substantially strike the surface of the energy input region at a desired orientation, e.g. normal, within +/−10 degrees, +/−20 degrees, or the like.

Figure 3:
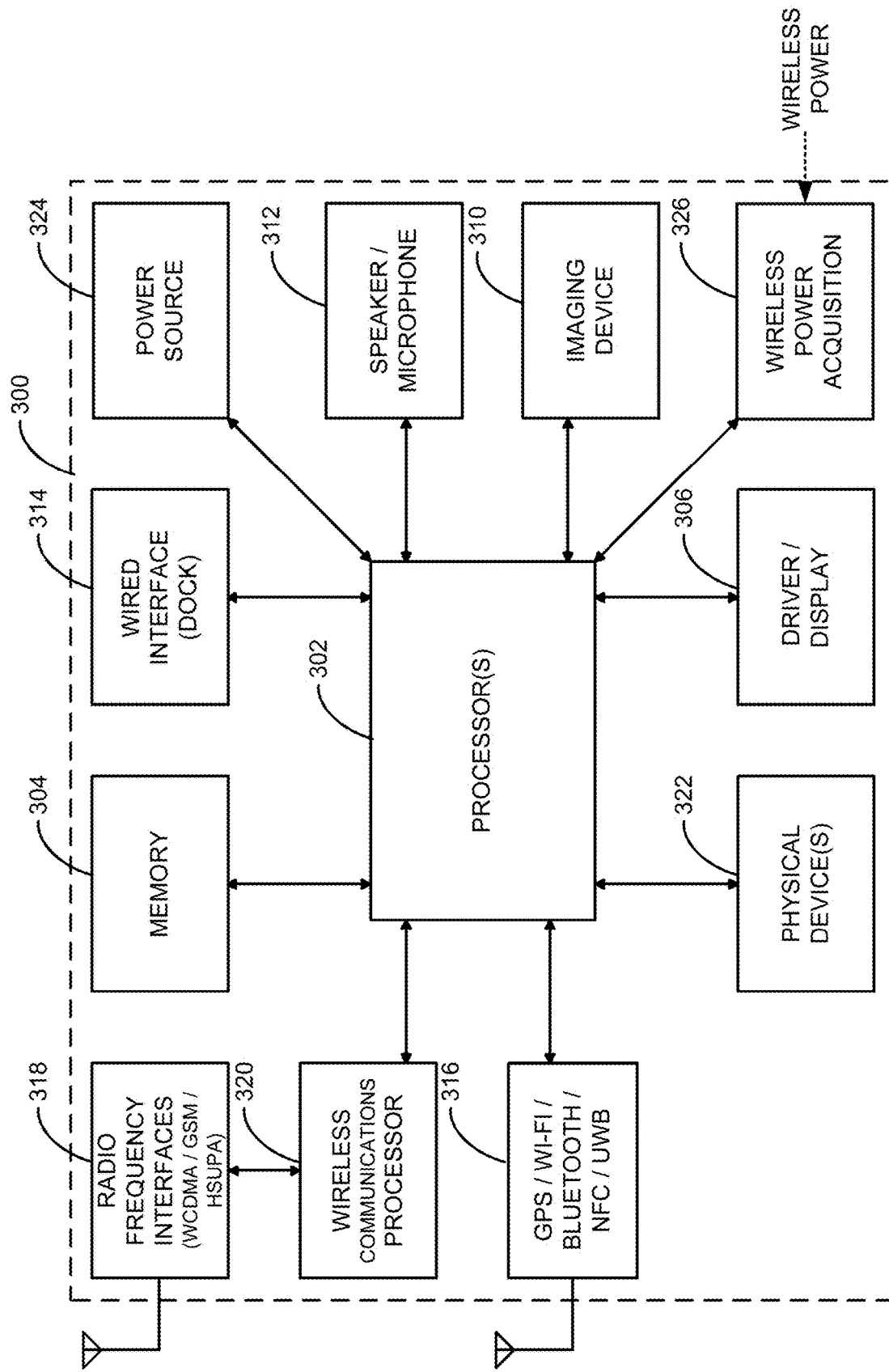
FIG. 3 is a block diagram illustrating an example of a system capable of implementing various processes in some embodiments.

In other embodiments, device 122 may include an accelerometer, a gyroscope, magnetometer, or the like that monitors the orientation of device 122 (e.g. 322 in FIG. 3). In these embodiments, based upon the amount of energy received by device 122, a user of device 122 may be instructed to change the orientation of device 122 relative to power output devices to attempt to increase the amount of power received. As an example of this, the user may be instructed to tilt a phone slightly upwards, rotate a laptop slightly clockwise, move their hand to the left, or the like. By doing so, the energy input region may be positioned more perpendicularly with respect to energy beam 120 to thereby increase the amount of power transferred. In some embodiments, visual or audio feedback may be given to the user. In other embodiments, the data from such sensors may also be provided back to power controller 116 so that power controller 116 can determine which power output device is more optimal for transferring power to device 122.

In some cases, device 122 may indicate it is substantially charged, charged to a particular level, is charged for a particular duration or the like via communications via beacons 106, or the like. In response to these conditions, device 122 leaving region 102 or the like, power controller 116 inhibits or stop output device 118 from providing energy beam 120 to device 122.

FIG. 3 illustrates a functional block diagram of various embodiments of the present invention. More specifically, it is contemplated that from user smart devices to cloud-based servers may be implemented with a subset or superset of the below illustrated components. In FIG. 3, a computing device 300 typically includes an applications processor 302, memory 304, a display 306, an image acquisition device 310, audio input/output devices 312, and the like. Additional communications from and to computing device 300 can be provided by via a wired interface 314 (e.g. dock, plug); a GPS/Wi-Fi/Bluetooth interface/UWB 316; RF interfaces 318 and driver 320, and the like. Also included in some embodiments are physical sensors 322 (e.g. MEMS-based accelerometers, gyros, magnetometers etc.). In some embodiments, a power supply 324 and a distance wireless charging interface 326.

In various embodiments, computing device 300 may be a hand-held computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset (e.g. Oculus Rift, HTC Vive, Sony PlaystationVR); a wearable device (e.g. Motiv smart ring, smart headphones); an implanted device (e.g. medical) or the like. Typically, computing device 300 may include one or more processors 302. Such processors 302 may also be termed application processors, and may include a processor core, a video/graphics core, and other cores. Processors 302 may include processor from Apple (A12, A13), NVidia (Tegra), Intel (Core), Quaicomm (Snapdragon), Samsung (Exynos), ARM (Cortex), MIPS technology. In some embodiments, processing accelerators may also be included, e.g. an AI accelerator, Google (Tensor processing unit), a GPU, or the like. It is contemplated that other existing and/or later-developed processors may be used in various embodiments of the present invention.

In various embodiments, memory 304 may include different types of memory (including memory controllers), such as flash memory (e.g. NOR, NAND), SRAM, DDR SDRAM, or the like. Memory 304 may be fixed within computing device 300 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. It is contemplated that other existing and/or later-developed memory and memory technology may be used in various embodiments of the present invention.

In various embodiments, display 306 may be based upon a variety of later-developed or current display technology, including LED or OLED status lights; touch screen technology (e.g. resistive displays, capacitive displays, optical sensor displays, electromagnetic resonance, or the like); and the like. Additionally, display 306 may include single touch or multiple-touch sensing capability. Any later-developed or conventional output display technology may be used for the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 306 may integrated into computing device 300 or may be separate.

In some embodiments of the present invention, acquisition device 310 may include one or more sensors, drivers, lenses and the like. The sensors may be visible light, infrared, and/or UV sensitive sensors that are based upon any later-developed or convention sensor technology, such as CMOS, CCD, or the like. In some embodiments of the present invention, image recognition algorithms, image processing algorithms or other software programs for operation upon processor 302, to process the image data. For example, such software may provide functionality such as: facial recognition (e.g. Face ID, head tracking, camera parameter control, or the like); fingerprint capture/analysis; blood vessel capture/analysis; iris scanning capture/analysis; and the like. In various embodiments of the present invention, imaging device 310 may provide user input data in the form of a selfie, biometric data, or the like.

In various embodiments, audio input/output 312 may include conventional microphone(s)/speakers. In various embodiments, voice processing and/or recognition software may be provided to applications processor 302 to enable the user to operate computing device 300 by stating voice commands. In various embodiments of the present invention, audio input 312 may provide user input data in the form of a spoken word or phrase, or the like, as described above. In some embodiments, audio input/output 312 may be integrated into computing device 300 or may be separate.

In various embodiments, wired interface 314 may be used to provide data transfers between computing device 300 and an external source, such as a computer, a remote server, a storage network, another computing device 300, a client device, or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 314 may also provide electrical power, or the like to power source 324, or the like. In other embodiments interface 314 may utilize close physical contact of device 300 to a dock for transfer of data, magnetic power, heat energy, or the like. Additionally, software that enables communications over such networks is typically provided.

In various embodiments, a wireless interface 316 may also be provided to provide wireless data transfers between computing device 300 and external sources, such as computers, storage networks, headphones, microphones, cameras, or the like. As illustrated in FIG. 3, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like. As described above, data transmissions between computing device 300 and reader 114 may occur via UWB, Bluetooth, ZigBee, Wi-Fi, a mesh network, or the like.

GPS receiving capability may also be included in various embodiments of the present invention. As illustrated in FIG. 3, GPS functionality is included as part of wireless interface 316 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces 318 and drivers 320 in various embodiments. In various embodiments, RF interfaces 318 may support any future-developed or conventional radio frequency communications protocol, such as CDMA-based protocols (e.g. WCDMA), GSM-based protocols, HSUPA-based protocols, G4, G5, or the like. In the embodiments illustrated, driver 320 is illustrated as being distinct from applications processor 302 and wireless interface 316. However, in some embodiments, various functionality are provided upon a single IC package, for example the Marvel PXA330 processor, and the like. It is contemplated that some embodiments of computing device 300 need not include the wide area RF functionality provided by RF interface 318 and driver 320.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 306 and inputs/or outputs to physical sensors 322 may be processed in parallel processing threads. In other embodiments, such events or outputs may be processed serially, or the like. Inputs and outputs from other functional blocks may also be processed in parallel or serially, in other embodiments of the present invention, such as acquisition device 310 and physical sensors 322.

In some embodiments of the present invention, physical sensors 322 (e.g. MEMS-based accelerometers, gyros, magnetometers etc.) may be provided. The data from such sensors may be used to capture data associated with device 300, and a user of device 300. Such data may include physical motion data, pressure data, orientation data, or the like. Data captured by sensors 322 may be processed by software running upon processor 302 to determine characteristics of the user, e.g. gait, gesture performance data, or the like. In some embodiments, sensors 322 may also include physical output data, e.g. vibrations, pressures, and the like.

In some embodiments, a power supply 324 may be implemented with a battery (e.g. LiPo), ultracapacitor, or the like, that provides operating electrical power to device 300. In some embodiments, a distance wireless charging interface 326 may be provided that receives a beam of energy, e.g. beam 120 in FIG. 1, and converts the energy into electrical power. The electrical power may be used to operate device 200 and to recharge power source 324. In some embodiments, interface 326 may include a coil of wires, an antenna structure, a heat absorption portion, and the like. It is contemplated that future-developed distance charging functionality may be incorporated into embodiments of the present invention.

FIG. 3 is representative of one computing device 300 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, a smart phone configured to perform may of the functions described above includes most if not all of the illustrated functionality. As another example, a biometric acquisition device, e.g. a smart ring (electronic devices enclosed in a ring-shaped shell, enclosure, or form factor), may include some of the functional blocks in FIG. 3, it need not include a high-resolution display 330 or a touch screen, a speaker/microphone 360, wired interfaces 370, or the like. In still other examples, a cloud-based server may not include image acquisition device 312, MEMs devices 322, GPS capability 316, and the like, further components described above may be distributed among multiple computers, virtual machines, or the like.

Figure 4:
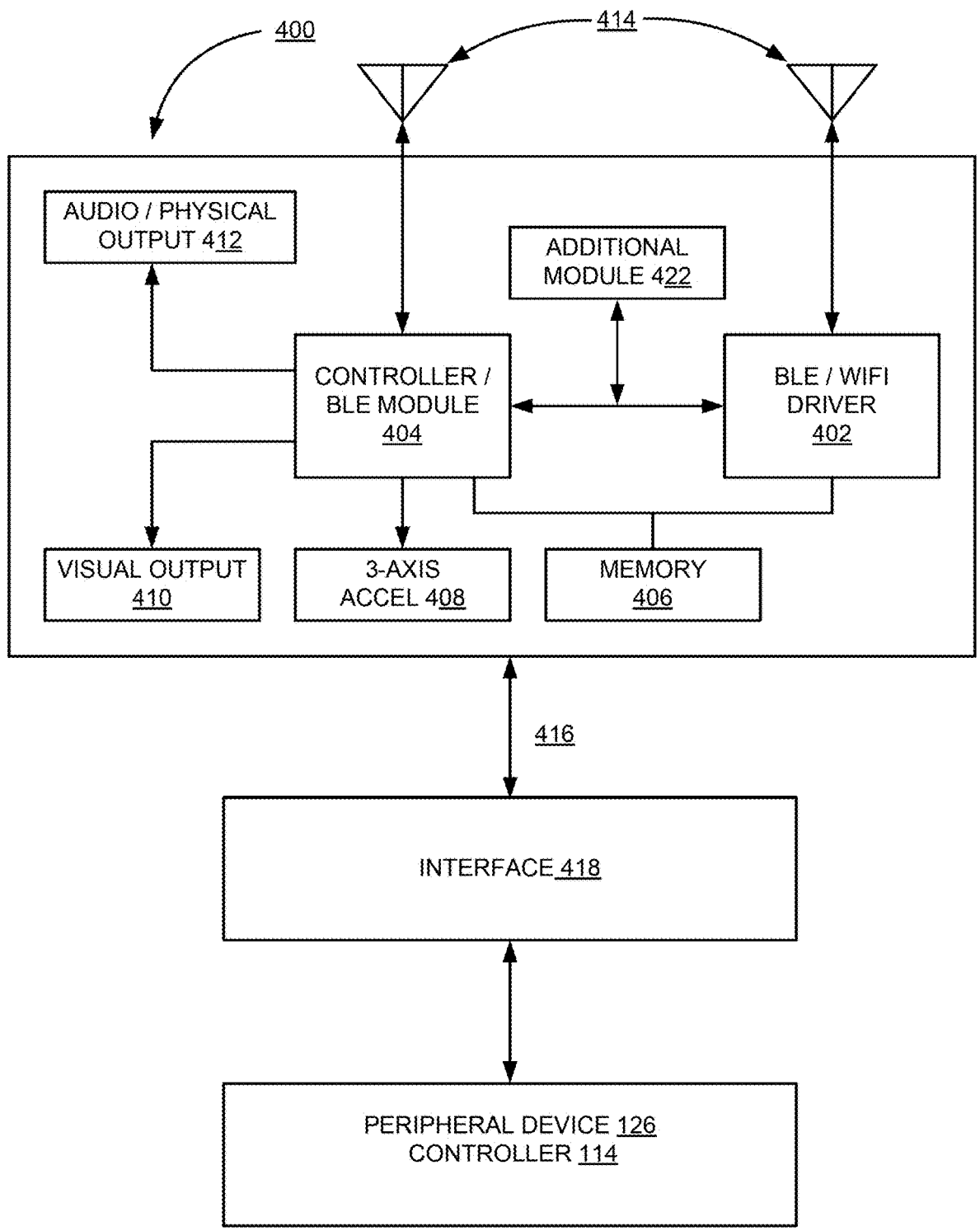
FIG. 4 is another block diagram of a reader according to various embodiments of the present invention.

FIG. 4 illustrates a block diagram according to some embodiments of the present invention. More specifically, FIG. 4 illustrates a block diagram of a reader device 400 described herein and illustrated as reader 114 in FIG. 1. In some embodiments, device 400 includes an rf control module 402, a controller 404, memory 406, an accelerometer 408, visual/haptic output 410, audio output 412, antennas 414, interface bus 416, and an interface module 418.

In some embodiments, controller 404 may be embodied as a Nordic nRF52832 system on a chip, suitable for controlling Bluetooth low energy (BLE) communications and UWB communications, and for performing various functionalities described herein. Controller 404 may include a processor, such as a 32-bit ARM® Cortex®-M4F CPU and include 512 kB to 44 kB RAM. In various embodiments, other types of SoC controllers may also be used, such as Blue Gecko from Silicon Labs, CC2508 from TI, or the like. Controller 402 may be embodied as a muRata 1LD Wi-Fi/BLE module, suitable for controlling Bluetooth low energy (BLE), Wi-Fi communications. Controller 402 may include a processor, such as a 32-bit ARM® Cortex®-M4. In various embodiments, other types of controllers may also be used, such as CYW43012 from Cypress, or the like. In some embodiments, modules 402 and 404 enable communication via short range communications protocols, such as BLE, ZigBee, UWB, Wi-Fi or the like. Modules 402 and 404 may also support mesh networking via BLE, Wi-Fi 4, or the like. In some embodiments, module 402 also supports Wi-Fi communications to communicate over a wide-area network (e.g. Internet).

In various embodiments, memory 406 may include non-volatile memory storing embodiments of the executable software code described herein. In some embodiments, the memory may be SRAM, Flash memory, or the like. In FIG. 4, audio/haptic output 412 is provided to give a user with audio feedback or haptic feedback and visual output 410 is provided to give a user visual feedback in response to the user approaching reader device 400. In some embodiments, visual output 410 may be one or more LED lights having different colored outputs, may be a status display panel. The feedback may be provided to the user based upon an application running upon the smart device and interacting with reader device 400. For example, if the smart device does not have the proper credentials for reader device 400, a harsh buzzing sound may be played by audio output 410, and a red flashing light may be output by visual output 410; if the smart device is authenticated with reader device 400, a bell ding sound may be played and the text "OK" may be displayed on a display; if the smart device is not authenticated with reader device 400, an audio message and textual message may be output: "Not authenticated. For service, please contact . . . " or the like.

Accelerometer 428 is provided in some embodiments to determine whether reader device 400 is tampered with. For example, after installed and operable on a mounting location (e.g. on a wall), accelerometer 428 monitors the orientation of accelerometer 428 with respect to gravity. If a party attempts to remove reader device 400 from a mounting surface, accelerometer 428 will be able to sense the change in orientation. Based upon the change in orientation exceeding a threshold, a number of actions may be taken by reader device 400. One action may be to cease operation of reader device 400, another action may be to alert a remote server of the tampering, and the like. In other embodiments, other physical sensors, e.g. pressure sensors, light sensors, gyroscopes, and the like may be used. Such embodiments may also provide tamper detection indication.

In FIG. 4, interface 416 is used to couple reader device 400 to interface module 418. In various embodiments, interface module 418 interfaces with any number of external functional modules, e.g. peripheral device 126 or controller 112 in FIG. 1, or the like. In one configuration, an external functional module 420 may be a peripheral device under control, e.g. an electronically controlled door latch, a television, a vending machine, a computer, an electronic panel, an automobile, a kiosk or the like; in another configuration, external functional module 420 may be an existing module that is configured to read conventional low frequency or high frequency (LF/HF/UHF/etc.) based proximity cards or badges; and the like as described herein. In some embodiments, external reader module 420 may be an existing reader mounted upon a wall, or the like. In some embodiments, interface 416 may provide power to reader module 400, interface 416 may transmit data from reader device 400 to interface module 418 (e.g. credentials), provide power or the like.

In one configuration, rf control module 402 is not used, and only one antenna 414 is provided, or vice versa; in another configuration, modules 402 and 404 are both used, and two antennas 414 are used (one specifically for scanning for ephemeral IDs within a geographic region and one specifically for handling communications with a smart device). Such embodiments are particularly useful in high volume situations wherein one antenna may receive ephemeral IDs from many different smart devices (e.g. 4 users walking down a hall near a security door or vending machine), whereas the other antenna will provide the credentials and receive tokens from the specific users' smart devices who want to interact with the reader (e.g. to enter the security door, to receive a good, to access a computer, receive power or the like). In other embodiments, other channels may be used to provide the above communications, such as short-range Wi-Fi, Zigbee, NFC, ANT, UWB or the like.

In still another configuration, additional modules 422 may be provided to add additional functionality to reader module 400. In some embodiments, module 422 may be an rf encoding module that converts data associated with the user (e.g. a badge number) into a format (e.g. LF/HF/UHF badge or tag) that is readable by a conventional RFID card or badge reader. In some embodiments, module 422 may include one or biometric capture devices that capture biometric data of a user associated with a smart device, or that couple to biometric capture devices. In some embodiments, biometric data may include facial data, voice data, eye data (e.g. iris, retina, blood vessel), print data (e.g. fingerprints, palm print, blood vessel), movement data (e.g. signature, movement, gait), and the like that may be used to facilitate authentication of the user.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

Further embodiments can be envisioned to one of ordinary skill in the art after reading this disclosure. For example, in some embodiments, authentication or authorization need not be performed for all devices (e.g. ring, smart device, etc.) In other embodiments, combinations or subcombinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method for an authorization system comprising:
   performing a pre-authorization process comprising:
      transmitting with a transceiver of a smart device, an identifier associated with a user of the smart device to a remote authentication server;
      determining in the remote authentication server a pre-authorization condition and identifiers associated with a plurality of reader devices the user is pre-authorized to interact with in response to the identifier associated with the user, and a plurality of policies;
      forming in the remote authentication server, a data packet comprising the identifiers associated with the plurality of reader devices in response to the pre-authorization condition;
      forming in the remote authentication server, a pre-authorization token in response to the identifier and to the pre-authorization condition;
      receiving with the transceiver of the smart device the data packet and the pre-authorization token from the remote authentication server; and
      storing in a secure storage of the smart device the data packet and the pre-authorization token; and thereafter
   performing a run-time process comprising:
      receiving with the transceiver of the smart device, an identifier associated with a reader device;
      determining with a processor of the smart device an authorized reader condition when the identifiers associated with the plurality of reader devices includes the identifier associated with the reader device;
      forming with the processor of the smart device a reader token in response to the pre-authorization token stored in the secure storage, and the authorized reader condition;
      transmitting with the transceiver of the smart device the reader token to the reader device;
      determining with a processor of the reader device an authorized user condition in response to the reader token; and
      directing with the processor of the reader device a peripheral device to perform a user-perceptible action for the user in response to the authorized user condition.

2. The method of claim 1, wherein before the determining with the processor of the smart device the authorized reader condition, the method further comprises:
   receiving with a sensor of the smart device biometric data of the user;
   determining with the processor of the smart device a biometric approval condition in response to the biometric data of the user; and
   wherein the determining with the processor of the smart device the authorized reader condition is in response to the biometric approval condition.

3. The method of claim 2, wherein the biometric data of the user is selected from a group consisting of: facial images, fingerprints, blood vessel scans, iris data, audio data, motion data, three-dimensional data, and gesture data.

4. The method of claim 1, wherein the data packet also comprises temporal data selected from a group consisting of: an issuing time stamp, a temporal validity period, and an expiration time.

5. The method of claim 1,
wherein the receiving with the transceiver of the smart device, the identifier associated with the reader device further comprises receiving with the transceiver of the smart device additional reader data from the reader device;
wherein the forming with the processor of the smart device the reader token is also in response to additional reader data; and
wherein the additional reader data is selected from a group consisting of a random number, a nonce, a pseudo-random number, data selected from a closed set of data.

6. The method of claim 5, further comprising:
storing in a memory of the reader device, a nonce;
determining with the processor of the reader device, payload data from the reader token;
determining with the processor of the reader device, a nonce match condition in response to the nonce and the data payload data; and
wherein the determining with the processor of the reader device the authorized user condition is also in response to the nonce match condition.

7. The method of claim 1, further comprising:
determining with the processor of the reader device, a time stamp associated with the reader token;
determining with the processor of the reader device, a time stamp match condition in response to the time stamp and a current time; and
wherein the determining with the processor of the reader device the authorized user condition is also in response to the time stamp match condition.

8. The method of claim 7,
wherein the determining with the processor of the reader device, the time stamp match condition comprises determining whether the time stamp is in a temporal relationship to the current time; and
wherein the temporal relationship is selected from a group consisting of: before, after, within a period of time before, and within a period of time after.

9. The method of claim 1,
wherein the pre-authorization process is performed before the run-time process by a period of time; and
wherein the period of time is selected from a group consisting of: an hour, a day, a week.

10. The method of claim 1,
wherein the peripheral device comprises an electrically controlled or electrical and mechanical controlled device; and
wherein the user-perceptible action is selected from a group consisting of: opening a gate, unlatching a door, displaying an indicator, making a sound, logging into a computing device, running a program on a smart television, and providing a product.

11. A smart device comprising:
a hardware transceiver configured to output a user identifier associated with a user of the smart device to a remote authentication server, wherein the hardware transceiver is configured to receive a data packet and a pre-authorization token from the remote authentication server, in response to the user identifier, wherein the data packet comprise reader identifiers associated with a plurality of reader devices, and wherein the pre-authorization token indicates that smart device is approved to interact with the plurality of reader devices;
a storage device coupled to the hardware transceiver, wherein the storage device is configured to store the reader identifiers and the pre-authorization token;
wherein the hardware transceiver is configured to receive a reader identifier associated with a reader device;
a processor coupled to the hardware transceiver and the storage device, wherein the processor is configured to determine an authorized reader condition when the reader identifiers includes the reader identifier associated with the reader device, wherein the processor is configured to determine a reader token in response to the pre-authorization token and the authorized reader condition;
wherein the hardware transceiver is configured to transmit the reader token to the reader device; and
wherein the reader device is configured to direct a peripheral device to perform a user-perceptible action for the user in response to the reader token.

12. The smart device of claim 11, further comprising a sensor coupled to the processor, wherein the sensor is configured to capture biometric data of the user;
wherein the processor is configured to determine a biometric approval condition in response to the biometric data of the user; and
wherein the processor is also configured to determine the authorized reader condition in response to the biometric approval condition.

13. The smart device of claim 12, wherein the biometric data of the user is selected from a group consisting of: facial images, fingerprints, blood vessel scans, iris data, audio data, motion data, three-dimensional data, and gesture data.

14. The smart device of claim 12, wherein the sensor is selected from a group consisting of: an imaging sensor, a MEMS accelerometer, a MEMS gyroscope, a pressure sensor.

15. The smart device of claim 12, further comprising a ring-shaped enclosure configured to store a first transceiver, the storage device, a second transceiver, a processor, and a power source.

16. The smart device of claim 15, wherein the sensor is disposed within an inner portion of the ring-shaped enclosure.

17. The smart device of claim 11, wherein the hardware transceiver comprises a short-range transceiver selected from a group consisting of: Bluetooth, Bluetooth Low Energy (BLE), Ultrawide Band (UWB), ZigBee, Wi-Fi.

18. The smart device of claim 11, wherein the hardware transceiver is configured to communicate with the remote authentication server via another smart device; and wherein the other smart device is selected from a group consisting of: a smart phone, a smart watch, a tablet and a computer.

19. The smart device of claim 11, wherein the data packet also comprises temporal data selected from a group consisting of: an issuing time stamp, a temporal validity period, and an expiration time.

20. The smart device of claim 11,
wherein the hardware transceiver is configured to receive additional reader data from the reader device;
wherein the processor is configured to determine the reader token also in response to additional reader data; and wherein the additional reader data is selected from a group consisting of: a random number, a nonce, a pseudo-random number, data selected from a closed set of data.

* * * * *